No. 835,634. PATENTED NOV. 13, 1906.
F. C. OLIN.
VALVE FOR GAS AND SIMILAR ENGINES.
APPLICATION FILED MAR. 8, 1905.
3 SHEETS—SHEET 2.
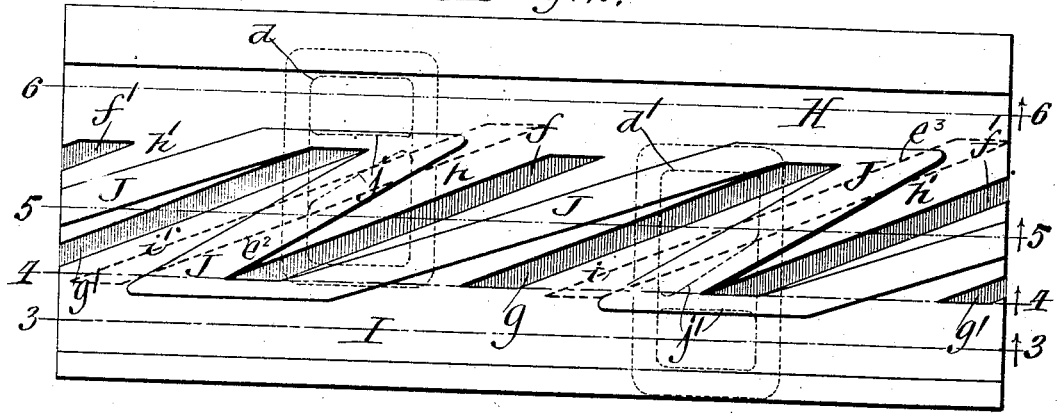
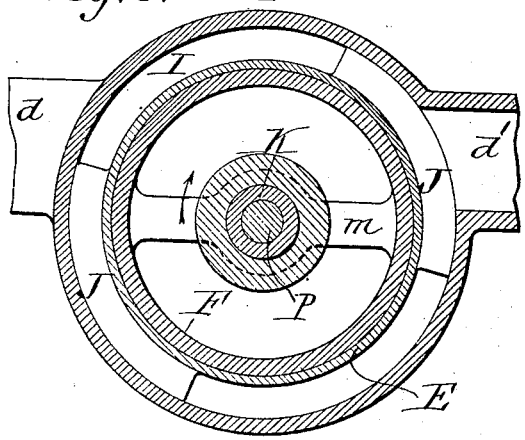
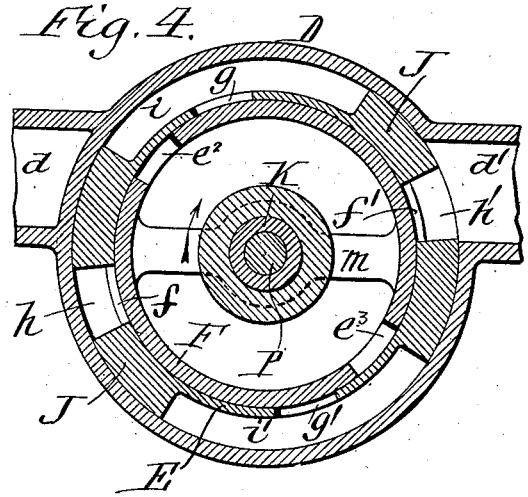
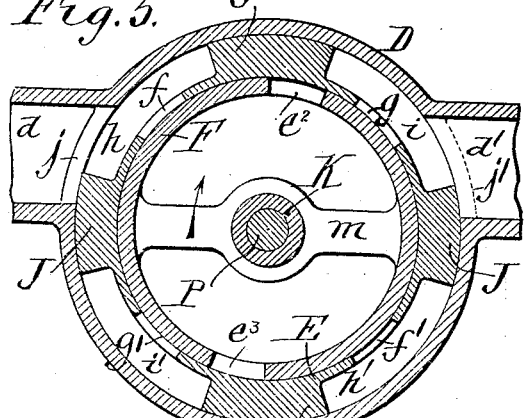
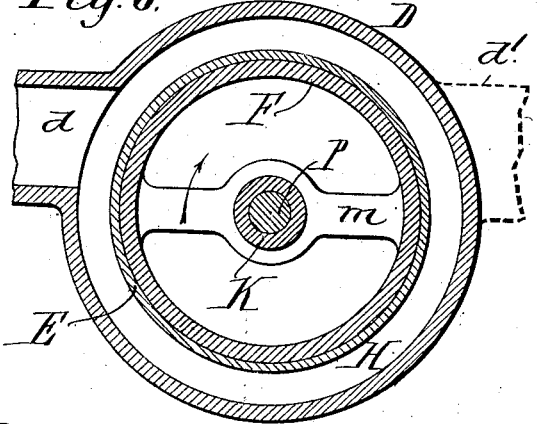
Witnesses:
Fred C. Olin, Inventor
by Geyer & Popp
Attorneys.

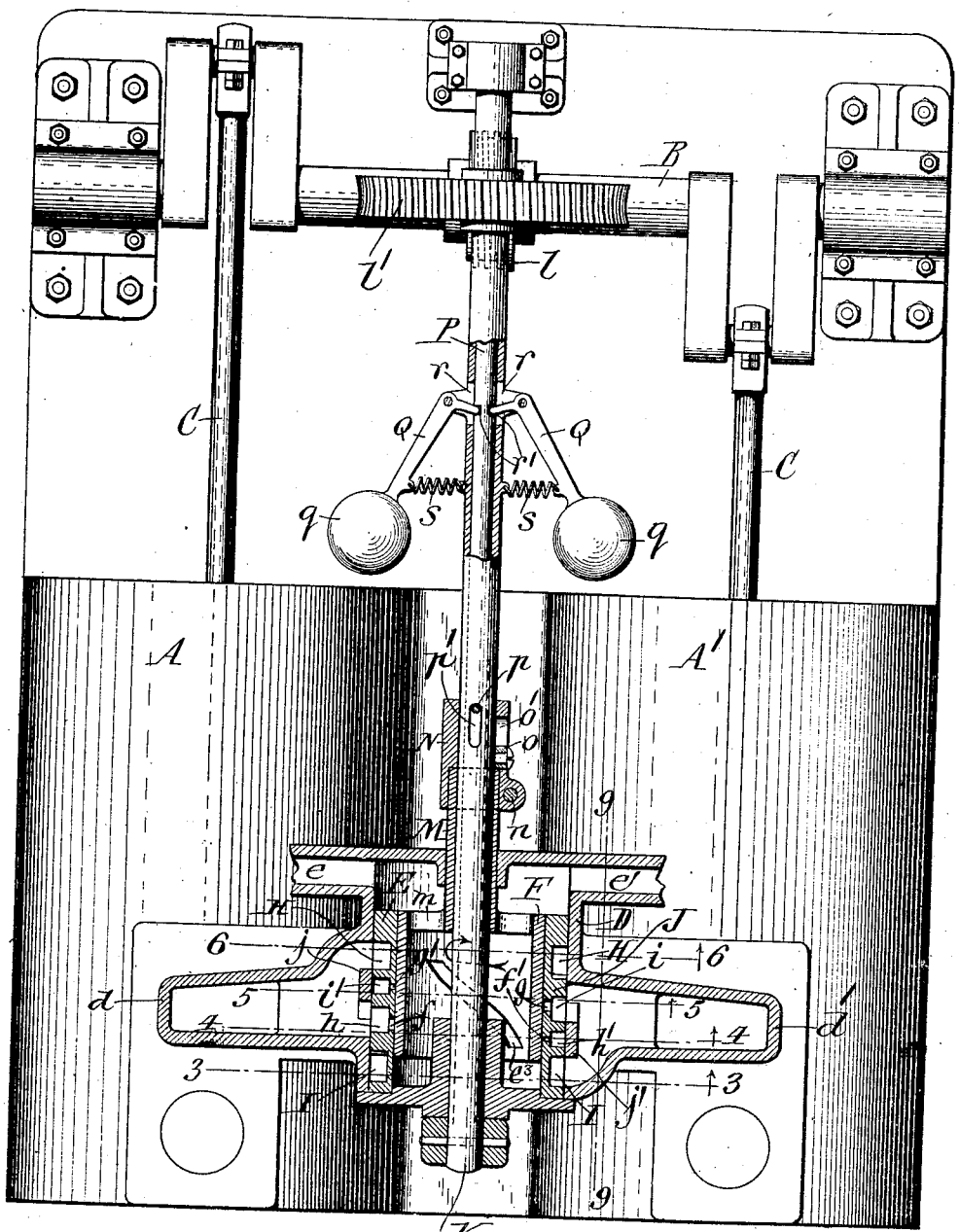

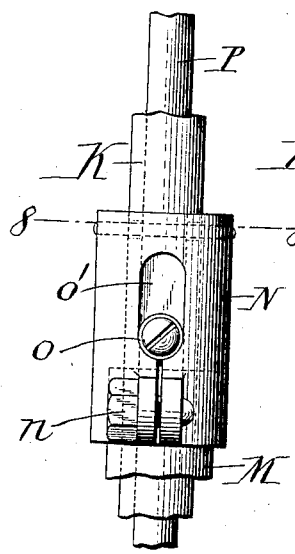
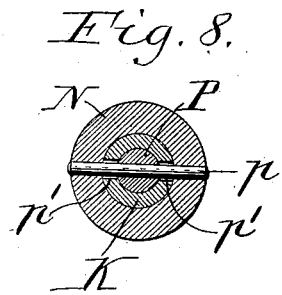
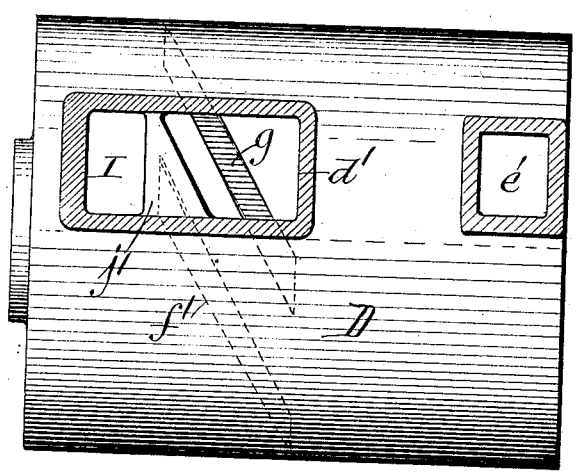
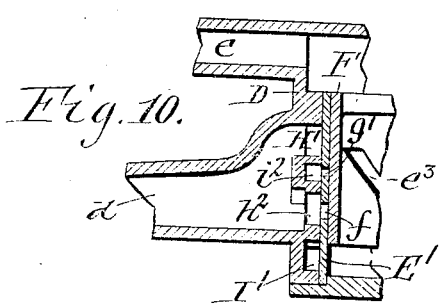
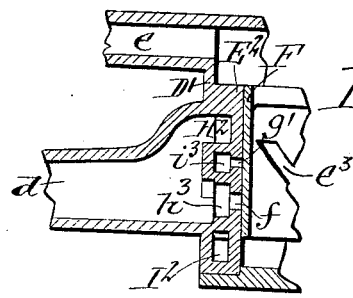

UNITED STATES PATENT OFFICE.

FRED C. OLIN, OF BUFFALO, NEW YORK.

VALVE FOR GAS AND SIMILAR ENGINES.

No. 835,634.     Specification of Letters Patent.     Patented Nov. 13, 1906.

Application filed March 8, 1905. Serial No. 249,001.

*To all whom it may concern:*

Be it known that I, FRED C. OLIN, a citizen of the United States, residing at Buffalo, in the county of Erie and State of New York, have invented a new and useful Improvement in Valves for Gas and Similar Engines, of which the following is a specification.

The object of this invention is to produce a simple and efficient valve for gas and similar engines in which the pressure against the valve is balanced, which enables full charges of fuel to be drawn into the cylinder with sharp cut-off, and which permits of fine regulation of the fuel-supply.

In the accompanying drawings, Figure 1 is a top plan view of a two-cylinder gas-engine equipped with my improved valve mechanism. Fig. 2 is a developed view of the valve-case from its outer side. Figs. 3, 4, 5, and 6 are cross-sections of the valve mechanism, taken in the correspondingly-numbered lines in Figs. 1 and 2. Fig. 7 is a side elevation, on an enlarged scale, of the valve-shaft and governor-rod and the coupling connecting the same. Fig. 8 is a cross-section of the same in line 8 8, Fig. 7. Fig. 9 is a vertical longitudinal section in line 9 9, Fig. 1. Figs. 10 and 11 are fragmentary sectional views showing modified constructions of the valve mechanism.

Similar letters of reference indicate corresponding parts throughout the several views.

My improved valve may be constructed for use in connection either with a single-cylinder engine or a multicylinder engine. In the accompanying drawings the valve mechanism is applied to a four-cycle engine having two cylinders. These engines may be of any suitable construction, the essential parts thereof consisting of two cylinders A A', arranged side by side, a main or crank shaft B, arranged transversely in front of the cylinders, and pitmen C, connecting the cranks of the main shafts with the pistons in the cylinders in a well-known manner.

The chest of the valve mechanism has a cylindrical body D, which is preferably arranged centrally between the engine-cylinders and parallel therewith, and two delivery passages or conduits $d\ d'$, leading from opposite sides of the body to the working ends of the engine-cylinders. Within the body of the valve-chest is a cylindrical valve casing or barrel E, which fits tightly at its periphery in the bore of the body.

F represents a cylindrical valve which rotates with its periphery in contact with the seat formed by the bore of the casing E. The interior of the valve communicates with the interior of the valve-body, and fuel is supplied thereto in any suitable manner—for instance, by an air-pipe $e$ and a gas-pipe $e'$, connecting with the front end of the body.

The valve-casing is provided with four ports $f\ f'$ and $g\ g'$, which are arranged equidistant but oblique relatively to the circumference or periphery of the casing. The ports $f\ f'$ form one pair or set which communicate with the conduit leading to the engine-cylinder A, while the other two ports $g\ g'$ form another pair or set which communicate with the passage leading to the other engine-cylinder and alternate with the ports of the first-mentioned set. The separation of the two sets of ports in the valve-casing and the connection of the same with their respective delivery-conduits is preferably effected by constructing the valve-casing as follows: H I represent annular delivery-channels, grooves, or conduits formed in the periphery of the valve-casing near opposite ends thereof. The channel H has two branch passages $h\ h'$ extending toward the channel I and communicating with the ports $f\ f'$, and the channel I has two branch passages $i\ i'$ extending toward the channel H and communicating with the ports $g\ g'$. By this arrangement of the passages $h\ h'\ i\ i'$ a partition or wall J of zigzag form is produced on the outer side or periphery of the valve-casing, which separates these two pairs or sets of passages and channels. The inlet ends of the conduits $d\ d'$ and the bore of the valve-body are so constructed that when the casing is in its proper position within the body the outer sides of the channels and their branch passages are closed by the bore of the body excepting at the inlet ends of the conduits $d\ d'$, one of which communicates solely with the channel H and its branch passages $h\ h'$ and ports $f\ f'$, while the other communicates solely with the other channel I and its branch passages $i\ i'$ and ports $g\ g'$, as shown in Figs. 1, 3, and 6.

The walls of the delivery-conduits $d\ d'$ are preferably rectangular, and two of their walls are parallel with the axis of the valve for convenience in construction and also for the sake of appearance. Owing to the oblique formation of the ports in the valve-casing, one end of the port $g'$ and its companion branch passage $i'$, which supply the conduit I, extend across the inlet end of the conduit $d$, and the port $f'$ and branch passage $h'$, which supply the delivery-conduit H, extend in like manner across the inlet end of the conduit $d'$, which in the absence of any corrective would interfere with the proper operation of the valve mechanism, because gas could leak from one delivery-conduit to another. In order to prevent this cross connection between the delivery-conduits the bore of the valve-body is provided with extensions or wings $j\ j'$, which project across the inlet ends of the conduits $d\ d'$ a sufficient extent to cover the ends of the branch passages $g'\ f'$, as shown by full lines in Figs. 1 and 9 and the left side of Fig. 5 and by dotted lines in Fig. 2 and the right side of Fig. 5.

The valve has two ports $e^2\ e^3$, which are arranged on its diametrically opposite sides, as shown in Figs. 4 and 5, and which are oblique relatively to the periphery or circumference of the valve. The longitudinal sides of the ports in the casing and in the valve are arranged at the same angle, and these sides of each port are parallel.

During each rotation of the valve its ports register alternately with the two sets of ports in the valve-case, thereby placing the interior of the valve alternately in communication with the delivery-conduits. When the valve-ports register with the case-ports $f\ f'$, the fuel mixture of gas and air passes successively from the interior of the valve and chest-body through said ports, branch passages $h\ h'$, annular channel H, and conduit $d$ to the engine-cylinder A, and when the valve-ports register with the case-ports $g\ g'$ the mixture passes successively through the valve-ports, case-ports $g\ g'$, branch passages $i\ i'$, channel I, and conduit $d'$ to the other engine-cylinder A'. It will be noted that the fuel mixture by this means is always drawn through the cylindrical valve from diametrically opposite sides thereof, thereby balancing the pressure against this valve, enabling the same to work freely and also reducing the wear upon the same to a minimum. Furthermore, this construction of valve mechanism permits of employing a large port area, thereby insuring a free flow and full charges of fuel and greater efficiency of the engine, inasmuch as the tendency to produce a vacuum and consequent back pressure in the cylinder is avoided while charge is being drawn in.

The branch passages $h\ h'$ and $i\ i'$ are preferably flared or enlarged toward their respective annular channels, as shown in Fig. 2, whereby the cross-sectional area of these passages is gradually increased to accommodate the increase in the volume of fuel upon approaching the channels, thereby avoiding throttling of the fuel-supply in these passages.

For the purpose of varying the supply of fuel in accordance with the speed of the engine, the valve while rotating is also moved lengthwise of its axis by means of a governor, so as to cut off the fuel-supply earlier or later during the suction-stroke of the piston, and thereby varying the size of the charge of fuel which is drawn into the cylinder and the power developed accordingly. The preferred means for automatically producing this regulation are shown in the drawings and are constructed as follows: K represents a horizontal valve-shaft extending axially through the valve case and body and held against axial movement. This shaft may be driven in any suitable manner, but preferably by a spiral pinion and a gear-wheel $l\ l'$ intermeshing with each other and secured to the main shaft and valve-shaft, respectively, as shown in Fig. 1. Surrounding the valve-shaft and extending through the front head of the body of the valve-chest is a sleeve M, which is connected at its inner end with the valve by a bridge or cross-piece $m$. At its outer end the sleeve is coupled with the valve-shaft so as to compel these parts to turn together, but permit the sleeve and valve connected therewith to move axially under the influence of the governor. This connection preferably consists of a collar N, arranged around the valve-shaft and the outer end of the sleeve and secured to the latter by a bolt $n$, connecting the split inner end of the collar and a projection or roller $o$, arranged on the valve-shaft and engaging with a longitudinal slot $o'$ in the collar, as shown in Figs. 1 and 7. P represents a governor-rod which slides lengthwise in the valve-shaft, which latter is made hollow or tubular for the purpose of receiving said rod. The valve is caused to move longitudinally with this rod by means of a transverse pin $p$, connecting the rod and the collar N and passing loosely through longitudinal slots $p'$ in the valve-shaft, as shown in Figs. 1 and 8. Q represents a pair of governor-levers pivoted on opposite sides of the valve-shaft to swing transversely thereto and having their outer arms provided with weights $q$, while their inner arms project through slots $r$ in said shaft and into engagement with the notches $r'$ in the governor-rod. The weighted arms of the governor-levers are yieldingly drawn inward by springs $s$. As the speed of the engine varies the governor-levers are turned inwardly or outwardly by the springs or centrifugal force, causing the rod P to be moved forward or backward in the valve-shaft. The rotary movement of the valve is so timed that its ports register with those of the casing and admit fuel to one cylinder or the other during the suction-strokes of the pistons in the respective cylinders. When the engine is running normally or under a heavy load, the governor operates to hold the valve in such a position that the time of cutting off the fuel-supply during the suction-stroke of the piston will be delayed as long as possible, permitting the maximum charges of fuel to enter the cylinder. As the speed of the engine increases above the normal or runs under a light load the governor operates to move the valve axially downward. This causes the oblique rear or trailing edge of its ports to be advanced circumferentially relatively to the ports of the casing and effects an earlier cut-off of the fuel-supply during the suction-stroke of the piston, whereby a smaller charge of fuel is drawn into the cylinder. By this means the fuel-supply is regulated in accordance with the requirements for maintaining the engine at a uniform speed. In order to thus permit of shifting the valve lengthwise for the purpose of varying the time of cutting off the fuel-supply without, however, throttling the flow of fuel, the ports of the valve are made of such length that they always register fully with those of the casing and maintain a constant port area. The relative length of these ports is shown in Fig. 2, in which the valve-ports $e^2$ $e^3$ appear in dotted lines and the casing-ports $ff'$ $gg'$ in full lines.

While it is preferable to construct the valve-casing separate from the valve-chest and form the annular channels and branch passages wholly in the outer side of the case, as shown in Fig. 1, the same effect can be produced by forming these channels and passages in the bore of the valve-chest body, as shown at $H'$ $I'$ $i^2$ $h^2$ in Fig. 10, instead of in the casing $E'$.

If desired, the valve-case $E^2$ and chest $D'$ may be constructed in one piece, as shown in Fig. 11, and still retain the channels $H^2$ $I^2$, branch passages $i^3$ $h^3$, and ports in the same relative position. Obviously the channels and their branch passages may be constructed partly in the bore of the chest-body and partly in the periphery of the valve-case.

It will be observed that it is immaterial whether the annular conduits and branch passages connect with the respective ports of the casing itself or whether they are formed in the chest-body surrounding the casing, in which latter construction the chest-body practically forms a part of the valve-casing.

Although it is preferable to effect the regulation of the fuel-supply by constructing the ports of the case and valve obliquely and moving the valve axially relatively to the case, the same result can be obtained by making the ports parallel to the axis of rotation and advancing or retarding the movement of the valve relatively to the valve-shaft by means of a governor mechanism in a well-known manner.

I claim as my invention.—

1. A gas-engine valve comprising a circular casing having a plurality of pairs of ports, the ports of each pair being connected together and independent of the other ports and arranged on opposite sides of the casing and alternating circumferentially with the other ports thereof, and a rotatable valve having ports on its opposite sides which are adapted to coöperate successively with the pairs of ports of the casing, substantially as set forth.

2. A gas-engine valve comprising a circular casing having two pairs of ports the ports of each pair being arranged on opposite sides of the casing and alternating circumferentially with the ports of the other pair, annular channels arranged at opposite ends of the casing and branch passages connecting the ports of each pair with one of said channels, and a rotatable valve having ports on its opposite sides which are adapted to coöperate successively with the pairs of ports of the casing, substantially as set forth.

3. A gas-engine valve comprising a circular casing having two pairs of ports arranged in an annular row around the casing and the ports of each pair being on opposite sides of the casing and alternating circumferentially with the ports of the other pair, annular channels arranged at opposite ends of the casing and two pairs of branch passages, each pair of passages extending from one of said channels toward the other channel and connecting with one pair of said ports, and a rotatable valve having ports on its opposite sides which are adapted to coöperate successively with the several pairs of ports in the casing, substantially as set forth.

4. A gas-engine valve comprising a chest having a circular body and delivery-conduits leading from opposite sides of said body, a casing arranged in said body and having two pairs of ports arranged in an annular row, the ports of each pair being on opposite sides of the casing and alternating circumferentially with the ports of the other pair and provided on its periphery with annular channels at opposite ends thereof and with two pairs of branch passages, the passages of each pair extending from one channel toward the other channel and connecting with one pair of ports in the casing forming a zigzag wall or partition between the alternating branch passages of both pairs, the outer sides of said channels and branch passages being closed by the bore of said chest-body and each channel and its branch passages communicating with one of said delivery-conduits, and a circular rotatable valve having two ports on opposite sides which are adapted to coöperate alternately with the two pairs of ports in the casing, substantially as set forth.

5. A gas-engine valve comprising a circular casing having two pairs of ports, the ports of each pair being arranged on opposite sides of the casing and having parallel oblique sides, annular channels arranged at opposite ends of the casing and branch passages connecting each pair of ports with one of said channels, and a rotatable valve having ports on its opposite sides which are adapted to coöperate successively with the pairs of ports of the casing and having each of its ports constructed with parallel oblique sides, substantially as set forth.

6. A gas-engine valve comprising a circular casing having a plurality of pairs of ports, the ports of each pair having connecting passages and being independent of the other ports and arranged on opposite sides of the casing and alternating with the other ports thereof, and a rotatable valve having ports on its opposite sides which are adapted to coöperate successively with the pairs of ports of the casing, each of said ports in the casing and in the valve having oblique parallel sides, substantially as set forth.

7. A valve mechanism for gas-engines, comprising a casing having oblique ports, a valve movable circumferentially and also axially and having oblique ports adapted to coöperate with the ports of the casing, a hollow shaft, a sleeve surrounding said shaft and connected with said valve, a collar arranged on said sleeve and having a longitudinal slot, a projection or roller arranged on the shaft and engaging with said slot, a longitudinally-movable governor-rod arranged in the shaft, and a pin connecting said rod and collar and extending through slots in the shaft, substantially as set forth.

Witness my hand this 4th day of March, 1905.

FRED C. OLIN.

Witnesses:
 THEO. L. POPP,
 EMMA M. GRAHAM.